United States Patent
Shrum, Jr. et al.

(10) Patent No.: US 7,751,406 B2
(45) Date of Patent: Jul. 6, 2010

(54) CONTROLLING QUALITY OF SERVICE AND ACCESS IN A PACKET NETWORK BASED ON LEVELS OF TRUST FOR CONSUMER EQUIPMENT

(75) Inventors: Edgar Vaughan Shrum, Jr., Smyrna, GA (US); Jeffrey A. Aaron, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 989 days.

(21) Appl. No.: 10/886,169

(22) Filed: Jul. 7, 2004

(65) Prior Publication Data

US 2006/0007936 A1    Jan. 12, 2006

(51) Int. Cl.
  *H04L 12/28* (2006.01)
  *H04J 3/16* (2006.01)
(52) U.S. Cl. .................. 370/395.21; 370/468; 370/235; 370/230; 709/228; 709/213; 709/224
(58) Field of Classification Search ............ 370/395.21, 370/395, 468, 235, 230, 395.32; 709/228, 709/213, 214
  See application file for complete search history.

(56) References Cited

U.S. PATENT DOCUMENTS

| | | | | |
|---|---|---|---|---|
| 6,154,778 A | * | 11/2000 | Koistinen et al. | ............ 709/228 |
| 6,631,134 B1 | * | 10/2003 | Zadikian et al. | ........ 370/395.21 |
| 2003/0014525 A1 | * | 1/2003 | DeLima et al. | ............. 709/227 |
| 2003/0065737 A1 | * | 4/2003 | Aasman | ....................... 709/213 |
| 2003/0074443 A1 | * | 4/2003 | Melaku et al. | .............. 709/224 |
| 2003/0223367 A1 | * | 12/2003 | Shay et al. | ................... 370/231 |
| 2004/0223497 A1 | * | 11/2004 | Sanderson et al. | ..... 370/395.52 |
| 2004/0228363 A1 | * | 11/2004 | Adamczyk et al. | .......... 370/468 |
| 2007/0169181 A1 | * | 7/2007 | Roskind | ....................... 726/5 |

OTHER PUBLICATIONS

"Header Format" by John Wells, Jul. 5, 2001. [webpages] [online]. Retrieved on Jul. 6, 2004. Retrieved from the internet: http://io.irean.vt.edu/~wells/rapport/node25.html. Total pages: 2.

"IPv6 Stateless Address Autoconfiguration" by S. Thompson, et al., IBM, Dec. 1998. [webpages] [online]. Retrieved on Jul. 6, 2004. Retrieved from the internet: http://asg.web.cmu.edu/rfc/rfc2462.html. Total pages: 19.

* cited by examiner

*Primary Examiner*—Aung S Moe
*Assistant Examiner*—Jamal Javaid
(74) *Attorney, Agent, or Firm*—Myers Bigel Sibley & Sajovec, P.A.

(57) ABSTRACT

A level of trust is determined for a consumer equipment. Based on the determined level of trust, a level of QoS is controlled for information packets that are associated with the consumer equipment and communicated through a packet switched network and/or access by the consumer equipment to communicate through the packet switched network is controlled. The consumer equipment may be selectively allowed to communicate through the packet switched network based on the determined level of trust and based on available resources of the packet switched network. Access to the packet switched network and allowed QoS for information packets communicated there through may thereby be based on a level of trust of the associated consumer equipment.

27 Claims, 3 Drawing Sheets

CONTROLLING QUALITY OF SERVICE AND ACCESS IN A PACKET NETWORK BASED ON LEVELS OF TRUST FOR CONSUMER EQUIPMENT

FIELD OF THE INVENTION

The present invention generally relates to the field of packet switched networks, and more particularly to controlling quality of service for information packets communicated through packet switched networks.

BACKGROUND OF THE INVENTION

The Internet has become a worldwide packet switched network for communicating not just data, such as email and pictures, but also for providing real-time bi-directional voice communications. The Internet includes a worldwide web (WWW) of client-server based facilities on which Web pages and files can reside, as well as clients (Web browsers) that can interface users with the client-server facilities. The topology of the WWW can be described as a network of networks, with providers of network service called Network Service Providers. Servers that provide application-layer services may be described as Application Service Providers. Sometimes a single service provider does both functions within a single business.

In recent years, broadband access technologies have facilitated the communication of voice, video, and data over the Internet and other public and private packet switched networks. Because broadband technologies are typically deployed by a single transport service provider, like a Regional Bell Operating Company (RBOC), their packet switched networks are often shared by many network service providers and application service providers.

Service providers can offer services that range from Internet access and virtual private network access to Voice over IP, Video on Demand, and Gaming. Because such services can have vastly different network resource requirements, some service providers can offer varying levels of Quality of Service (QoS) to subscribers. For example, service providers may allow subscribers to mark their packet communications with a requested QoS level. Such markings may be made by consumer equipment that the subscriber uses to interface to a packet switched network. The packet switched network may then, based on the requested QoS level and its presently available resources, vary the communication bandwidth and priority that it uses to communicate that subscriber's packet communications.

SUMMARY OF THE INVENTION

Some embodiments of the present invention provide methods of communicating information packets through a packet switched network. A level of trust is determined for a consumer equipment. Based on the determined level of trust, a level of QoS is controlled for information packets that are associated with the consumer equipment and communicated through a packet switched network and/or access by the consumer equipment to communicate through the packet switched network is controlled. Accordingly, the QoS level with which information packets are communicated through the packet switched network may be based on the level of trust of the associated consumer equipment. Alternatively, or additionally, access by the consumer equipment to communicate through the packet switched network can be controlled based on the level of trust of the associated consumer equipment.

For example, consumer equipment that has a high level of trust may be allowed a higher QoS level than, and/or priority access to the packet switched network compared to, other consumer equipment having a lower level of trust.

In some further embodiments of the present invention, the consumer equipment may be selectively allowed to communicate through the packet switched network based on the determined level of trust, and this may be further based on available resources of the packet switched network.

In some further embodiments of the present invention, the QoS level may be controlled based on a direct QoS level request (e.g., via a special QoS request message) and/or an indirect QoS level request (e.g., via marked packets) that is received from the consumer equipment. A QoS level may then be granted to the consumer equipment based on the determined level. The granted QoS level may be selected from among at least two QoS levels, and, in some embodiments, three or more QoS level, based on the determining level of trust. Information packets may then be communicated through the packet switched network based on the selected QoS level. The QoS level may be controlled by controlling capacity in the packet switched network that is allowed to be used to communicate information packets associated with the consumer equipment, communication delay in the packet switched network for information packets associated with the consumer equipment, loss rate in the packet switched network for information packets associated with the consumer equipment, and/or priority in the packet switched network for information packets associated with the consumer equipment. A history of at least some earlier determined levels of trust may be maintained, and QoS may be controlled based on the determined level of trust and the history.

In some further embodiments of the present invention, the determined level of trust may be based on whether information in the consumer equipment has changed, based on a trust profile for the consumer equipment, and/or based on authentication of the consumer equipment.

In some other embodiments of the present invention, a packet switched network includes a trust determination system. The trust determination system is configured to determine a level of trust for consumer equipment, and is configured to control a QoS level for information packets that are associated with the consumer equipment and communicated through the packet switched network based on the determined level of trust.

In some further embodiments of the present invention, the packet switched network may further include a network connection admission control that is configured to selectively allow the consumer equipment to communicate through the packet switched network based on the determined level of trust and based on available resources of the packet switched network. The trust determination system may be configured to control the capacity in the packet switched network that is allowed to be used to communicate information packets associated with the consumer equipment, communication delay in the packet switched network for information packets associated with the consumer equipment, loss rate in the packet switched network for information packets associated with the consumer equipment, and/or priority in the packet switched network for information packets associated with the consumer equipment.

In some other embodiments of the present invention, consumer equipment includes a controller that is configured to communicate information packets through a packet switched network at a QoS level that is defined by the packet switched network, configured to generate trust indications and to communicate the trust indications to the packet switched network for use in determining a level of trust for the consumer equipment and controlling the QoS level for communications therewith.

Other methods, packet switched networks, consumer equipment and/or computer program products according to embodiments will be or become apparent to one with skill in the art upon review of the following drawings and detailed description. It is intended that all such additional methods, packet switched networks, consumer equipment and/or computer program products be included within this description, be within the scope of the present invention, and be protected by the accompanying claims.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention may be embodied as methods, packet switched networks, and/or consumer equipment. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, packet switched networks, and consumer equipment according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
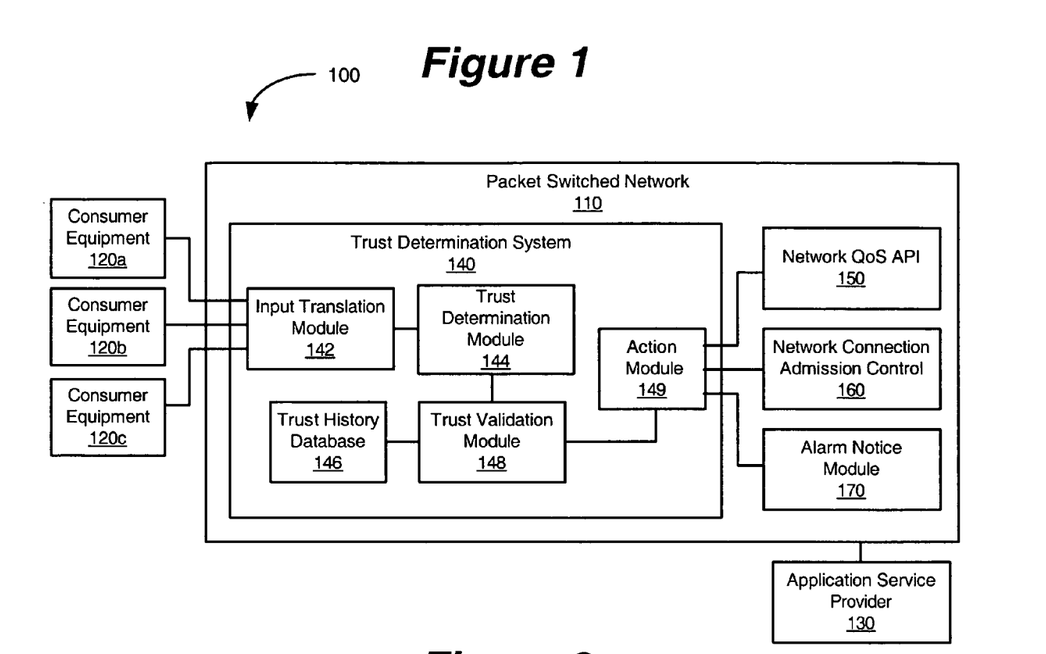
FIG. 1 is a block diagram of a communication system and method that determines a level of trust for consumer equipment and controls quality of service based thereon according to some embodiments of the present invention.

FIG. 1 is a block diagram of a communication system 100 and method that includes a packet switched network 110, consumer equipment 120a-c, and an application service provider 130. The packet switched network 110 can route information packets between the consumer equipment 120a-c and the application service provider 130, and may route the information packets to various other networks, equipment, and/or service providers. According to some embodiments of the present invention, the packet switched network 110 can include a trust determination system 140, a network Quality of Service (QoS) application interface (API) 150, a network connection admission control 160, and an alarm notice module 170.

As used herein, the term "consumer equipment" includes any device that is configured to communicate information packets with a packet switched network, and includes, but is not limited to, a cable modem, a digital subscriber line modem, a public switched telephone network modem, a wireless local area network modem, a wireless wide area network modem, a computer with a modem, a mobile terminal such as personal data assistant and/or cellular telephone with a modem. For consumer equipment that communicates with a packet network through a wireless interface, the consumer equipment may be configured to communicate via a wireless protocol such as, for example, a cellular protocol (e.g., General Packet Radio System (GPRS), Enhanced Data Rates for Global Evolution (EDGE), Global System for Mobile Communications (GSM), code division multiple access (CDMA), wideband-CDMA, CDMA2000, and/or Universal Mobile Telecommunications System (UMTS)), a wireless local area network protocol (e.g., IEEE 802.11), a Bluetooth protocol, another RF communication protocol, and/or an optical communication protocol.

The consumer equipment 120a-c can request a QoS level for information packets that are communicated therewith through the packet switched network 110. A QoS request may be communicated from the consumer equipment 120a-c as part of an information packet to the packet switched network 110. A requesting one of the consumer equipment 120a-c may, for example, make a QoS request on its own initiative and/or in response to a request from another one of the consumer equipment 120a-c and/or from an application that is hosted by the application service provider 130.

The packet switched network 110 can include, but is not be limited to, an internet protocol (IP) network or other network in which an IP protocol is used in whole or in part, an Asynchronous Transfer Mode (ATM) network, a Frame Relay network, and/or any other network in which data that is to be communicated is separated into chunks which are communicated separately over the network.

The trust determination system 140 is configured to determine a level of trust of the requesting consumer equipment 120a-c, and to control the QoS for information packets associated with the requesting consumer equipment 120a-c based on the determined level of trust. The trust determination system 140 may also selectively allow and disallow the consumer equipment 120a-c to communicate through the packet switched network 110 based on the determined level of trust. For example, when the trust determination system 140 determines that the consumer equipment 120a has a relatively high level of trust, it may allow the consumer equipment 120a to have a correspondingly high QoS level for its information packets and a high priority for access to the packet switched network 110, and conversely, when the consumer equipment 120a has a relatively low level of trust, it may restrict the consumer equipment 120a to a correspondingly low QoS level for its information packets and a low level of access priority. Accordingly, a determination of a low level of trust for the consumer equipment 120a can cause it to only have access when the packet switched network 110 has at least a threshold amount of available resources (e.g., low utilization), and/or can cause it to have a low QoS level for its packet communications.

The network QoS API 150 and the network connection admission control 160 may then carry out the management of QoS and network admission, respectively, under the control of the trust determination system 140. In particular, the network QoS API 150 may manage a QoS level for information packets associated with the requesting consumer equipment 120a-c based on command(s) from the trust determination system 140. QoS level management by the network QoS API 150 may be based on what resources are available in the packet switched network 110. The network connection admission control 160 may selectively allow and disallow the consumer equipment 120a-c to communicate through the packet switched network based on command(s) from the trust determination system 140 and based on available resources of the packet switched network 110.

The trust determination system 140 may control QoS by selecting a QoS level from among three or more QoS levels based on the determined level of trust. For example, the trust determination system 140 may include a ranked group of two or more QoS levels (e.g., ranked high to low QoS levels). A QoS request can then be evaluated based on the level of trust determined for an associated consumer equipment, and a QoS level can be selected from among the group of QoS levels. The group of QoS levels may, for example, include a high QoS level, a medium QoS level, and a low QoS level. Selection of a QoS level may include comparing the determined level of trust to one or more threshold values and selecting a QoS level based on the comparison(s). The selected QoS level can be communicated to the network QoS API 150, which can manage the QoS provided for information packets that are associated with the consumer equipment based on the selected QoS level, and which management may be further based on available resources in the packet switched network 110 (e.g., present utilization of resources). Alternatively, the group of QoS levels may include, for example, a range of non-discrete levels between a high QoS level and a low QoS level, from among which the trust determination system 140 may determine a QoS level for a consumer equipment (e.g., via selection, algorithm, or other process) and control QoS associated with the communicated packets flowing to/from consumer equipment.

The trust determination system 140 may maintain a history of at least some earlier determined levels of trust for the consumer equipment 120a-c, and may control the associated QoS level based on a determined level of trust and based on the history. For example, the trust determination system 140 may determine a baseline QoS level based on a determined level of trust, such as by selecting among a group of QoS levels, and may then determine a final allowed QoS level for a consumer equipment based on the history. For example, when one of the consumer equipment 120a-c has had a history of high determined levels of trust, a rare occurrence of a low determined level of trust may not be used, or may be relatively scaled based thereon, to affect the QoS level that is allowed for that consumer equipment. Conversely, when one of the consumer equipment 120a-c has had a history of low determined levels of trust, a high determined level of trust may not be used, or may be relatively scaled based thereon, to affect the QoS level that is allowed for that consumer equipment.

A requested and/or allowed QoS level may correspond to any characteristic relating to how information packets can be communicated through the packet switched network 110. For example, a QoS level may correspond to a capacity (e.g., bandwidth) in the packet switched network 110 that is allowed to be used to communicate information packets associated with the consumer equipment 120a-c, communication delay in the packet switched network 110 for the information packets, loss rate in the packet switched network 110 for the information packets, prioritization in the packet switched network 110 for the information packets, and/or a traffic profile for the information packets. A traffic profile may correspond to performance characteristics such as, for example, long term maximum packet traffic rate and/or short term packet burst size, and may vary in a predefined manner over time. The QoS level may be applicable to, for example, any network in which two or more flows, streams, connections, and/or information communications, which may be associated with different end users, compete for resources and are dynamically assigned resources or a particular amount/level of resources via direct QoS requests (e.g., request messages) and/or indirect QoS requests (e.g., data having or containing QoS-related markings).

Communications between the consumer equipment 120a-c, the application service provider 130, and/or an application that is hosted on the application service provider 130, can thereby be controlled based on the determined level of trust for the consumer equipment 120a-c. For example, such communications may be managed so that a particular amount of bandwidth is allocated to the communications, so that the rate of communicated information packets is restricted to no more than an allowed capacity level, so that delay of information packets is no more than an allowed delay level, so that no more information in a information packet is lost than is allowed by an allowed loss rate, so that information packets are prioritized based on an allowed prioritization level, and/or so that information packets are limited to a predefined traffic profile. The allowed QoS level may also define the size of information packets (e.g., maximum transmission unit size) that are communicated through the packet switched network 110, and/or it may cause a traffic profile to be modified based on the allowed QoS level.

The trust determination system 140 may determine a level of trust for each of the consumer equipment 120*a-c* based on whether information in the corresponding consumer equipment 120*a-c* has changed, based on authentication of each of the consumer equipment 120*a-c*, and/or based on a trust profile or indication for each of the consumer equipment 120*a-c*.

Whether information in the consumer equipment 120*a* has changed can be used to determine the level of trust because such changes may indicate that the consumer equipment 120*a* has been improperly modified, such as having been tampered with and/or hacked-into, and/or can indicate that it has otherwise become corrupted so that it is no longer trusted to generate valid QoS requests. The trust determination system 140 may hash one or more portions of information in the consumer equipment 120*a* to determine whether the information has changed.

As used herein, the term "hash" includes, but is not limited to, a mathematical algorithm or other relationship that is used to relate input information to output information. For example, input information may be hashed by performing an exclusive-OR (XOR) based operation on bytes of the input information to generate a fixed-size output value (e.g., a binary string). Thus, for example, hashing two identical information strings will generate the same hash values, while hashing two non-identical information strings can generate different hash values. Hashing may be carried out using standard cryptographic algorithms where hashing of two identical information strings generates the same hash values, which hashing of two non-identical information strings generates different hash values. Exemplary cryptographic hash algorithms that may be used with some embodiments of the invention include Secure Hash Algorithms (e.g., SHA-1) and/or Message Digest (e.g., MD2, MD4, and MD5) algorithms.

The consumer equipment 120*a* may be evaluated by repetitively hashing information in the consumer equipment 120*a* over time to generate hash values, and comparing the hash values to determine whether they have changed over time. The trust determination system 140 can then determine a level of trust based on the comparison. For example, information in the consumer equipment 120*a* may be hashed to generate a first hash value. Hashing of the information to generate the first hash value may be carried out by the trust determination system 140, the consumer equipment 120*a*, and/or elsewhere, such as by a manufacturer of the consumer equipment 120*a*. When the first hash value is generated elsewhere than the trust determination system 140, it is then communicated thereto. The trust determination system 140 may, for example, generate the first hash value for information and then communicate to the information to the consumer equipment 120*a*, and/or it may maintain a copy of the information in the consumer equipment 120*a* from which it can generate the first hash value. The consumer equipment 120*a* may then hash the information within it to generate a second hash value, and communicate the second hash value to the trust determination system 140. The trust determination system 140 compares the first hash value and the second hash value to determine a level of trust for the consumer equipment 120*a*. For example, the level of trust can be indicative of whether the consumer equipment 120*a* has been successfully or unsuccessfully verified based on whether the first hash value is the same as the second hash value, or based on another relationship between the first and second hash values.

Hashing the information in the consumer equipment 120*a-c* may be carried out based on a trust determination request from the trust determination system 140. The trust determination system 140 may, for example, request the consumer equipment 120*a* to hash all or selected portions of its information to generate one or more hash values after an elapsed time since an earlier hashing of the all or selected portions of the information. The trust determination system 140 may select what portion(s) of the information are to be hashed, and may identify the selected portion(s) of the information with a trust determination request. The consumer equipment 120*a* may alternatively, or additionally, determine what portion(s) of the information are to be hashed, and may identify the selected portion(s) to the trust determination system 140 with the generated hash value(s).

The trust determination system 140 may determine a level of trust for each of the consumer equipment 120*a-c* based on authentication of the consumer equipment 120*a-c*. The authentication may be based on one or more trust indications that are generated by the trust determination system 140 and/or that are received from other equipment, such as from one or more authentication servers. For example, the consumer equipment 120*a-c* may each participate in an authentication process that generates trust indications based on, for example, a Security Assertion Mark-up Language (SAML) protocol, a WEB services security protocol, a Kerberos or other security ticket protocol, and/or a Remote Authentication Dial-In User Service (Radius) protocol. The Kerberos protocol can include assigning a unique ticket (i.e., security credential) to a user, which the user can embed within an information packet to identify the sender and allow authentication based thereon. The Radius protocol can include using an authentication and accounting server to verify user entered usernames and passwords for purposes of access control.

The trust determination system 140 may generate and/or receive, such as from authentication servers, a plurality of trust indications that it may combine to separately determine the level of trust for each of the consumer equipment 120*a-c*. For example, it may determine a level of trust for consumer equipment 120*a* based on whether and/or what information therein has changed, and based on a weighted combination of trust indications from authentication of user entered username and password combinations, security ticket/key, and/or another authentication process.

The trust determination system 140 may determine a level of trust for each of the consumer equipment 120*a-c* based on a trust profile for each of the consumer equipment 120*a-c*. The trust determination system 140 may generate, and/or receive from elsewhere, the trust profile for the consumer equipment 120*a-c*. The trust profile may be, for example, based on an account subscription level that is associated with the consumer equipment, credit information associated with a subscriber who is associated with the consumer equipment, law enforcement records associated with the subscriber, presence of children in a household of the subscriber, ages of children in the household of the subscriber, and/or earlier trust levels determined for the consumer equipment.

When the trust determination system 140 receives a QoS level request for more than one of the consumer equipment 120*a-c*, such as associated with information packets that are concurrently being communicated through the packet switched network 110, it may determine a level of trust for each of the associated consumer equipment 120a-c. The trust determination system 140 may then rank (i.e., prioritize) the QoS level requests based on the determined levels of trust, and may control QoS for the information packets based on the ranked QoS level requests. For example, when two equal level QoS requests are received, one of the QoS level requests may be granted a higher QoS level than the other QoS level request based on relative differences between the determined levels of trust of the associated consumer equipment. Moreover, the trust determination system 140 may grant a higher access privilege to one of the consumer equipment relative to another consumer equipment based on relative level of trusts and associated rankings. Accordingly, a higher level of trust may allow information packets for a consumer equipment to have a higher granted QoS level, and/or the consumer equipment may be able to access the packet switched network 110 when it otherwise could not if it had a lower level of trust.

As shown in FIG. 1, the trust determination system 140 can include an input translation module 142, a trust determination module 144, a trust history database 146, a trust validation module 148, and an action module 149. The input translation module 142 can serve as an interface between the trust determination module 144 and the consumer equipment 120a-c, and may combine trust indications from a plurality of authentication processes (e.g., SAML, a WEB services security protocol, Kerberos, and/or a Radius) to generate a combined trust indication for use by the trust determination module 144.

The trust determination module 144 may determine a level of trust for each of the consumer equipment 120a-c, and the determination may be responsive to QoS requests associated with the consumer equipment 120a-c. The trust determination module 144 may determine a level of trust based on whether information in the corresponding consumer equipment 120a-c has changed, based on authentication of each of the consumer equipment 120a-c, and/or based on a trust profile for each of the consumer equipment 120a-c. The trust determination module 144 may rank (e.g., prioritize) the QoS level requests based on the determined levels of trust, and may control QoS for the information packets based on the ranked QoS level requests.

The trust history database 146 may track at least some earlier determinations of the level of trust for each of the consumer equipment 120a-c. The trust validation module 148 may control the QoS levels that are to be allowed for the consumer equipment 120a-c based on the historical information in the trust history database 146 and/or based on other rules for determining how QoS levels may change over time or between QoS requests.

The action module 149 may communicate the allowed QoS level as one or more commands to the network QoS API 150 and/or the network connection admission control 160 to respectively control the QoS level for information packets associated with the consumer equipment 120a-c and to control communication access for the consumer equipment 120a-c through the packet switched network 110. The action module 149 may also generate an alarm indication to the alarm notice module 170, which may generate an alarm notification to, for example, a system operator. The system operator may investigate an alarm notification to, for example, determine whether actions are to be taken with respect to the associated consumer equipment. System operator actions may include contacting a subscriber who is associated with the consumer equipment and/or denying future QoS requests and/or network access from the consumer equipment.

Although FIG. 1 illustrates an exemplary communication system 100, it will be understood that the present invention is not limited to such a configuration, but is intended instead to encompass any configuration capable of carrying out the operations described herein. For example, although only three consumer equipment 120a-c and a single packet switched network 110 and application service provider 130 have been shown for illustration purposes, it will be understood that the packet switched network 110 would generally route information packets among thousands of consumer equipment and numerous application service providers. Moreover, although only a single trust determination system 140, application service provider 130, network QoS API 150, network connection admission control 160, and alarm notice module 170 have been shown for illustration purposes, it will be understood that the function/acts described herein for those elements may be at least partially combined or divided among one or more of the illustrated elements and/or new element(s). Moreover, it will be understood that the a plurality of input translation modules may be geographically proximate to various consumer equipment, and various other elements of the trust determination system 140 may be may be centrally located within a central data center.

Figure 2:
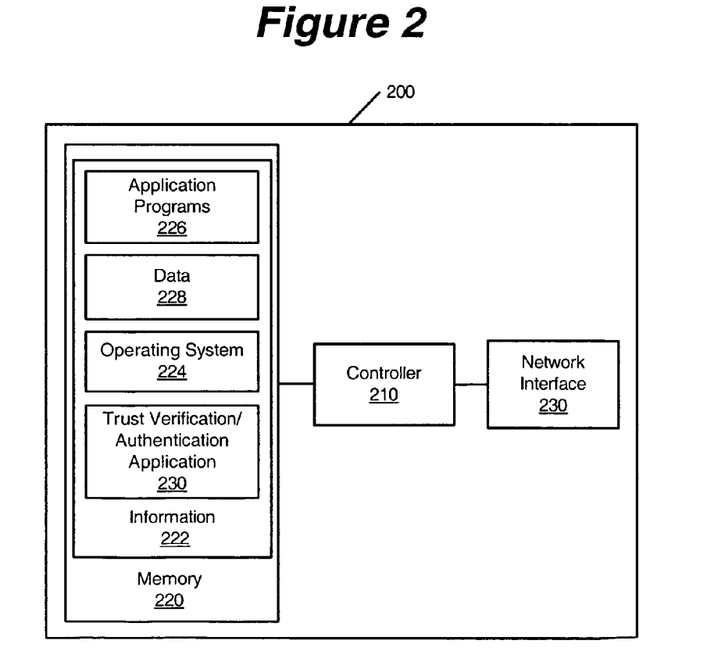
FIG. 2 is a block diagram of a consumer equipment and method that generates a trust indication that may be used to determine a level of trust for the consumer equipment according to various embodiments of the present invention.

Referring now to FIG. 2, an exemplary consumer equipment 200 is shown. The consumer equipment 200 includes a controller 210, a memory 220, and a network interface 230. The memory 220 is representative of the overall hierarchy of memory devices, which can include one or more read-only memories, read-write memories, firmware, flash memory, disk drives, file systems, removable drives and/or other devices that are configured to retrievably store information. Such memory 220 contains the information 222 used to implement the functionality of the consumer equipment 300. As shown in FIG. 2, the exemplary memory 220 includes several categories of the information 222 used in the consumer equipment 200: an operating system 224, application programs 226, data 228, and a trust verification/authentication application 230.

As will be appreciated by those of skill in the art, the operating system 224 may be any operating system suitable for operating consumer equipment, and may include, but not be limited to, Cisco IOS, VxWorks, various proprietary modem operating systems, Windows95, Windows98, Windows2000, WindowsXP, Windows CE, Unix, Linux, PalmOS, and/or Java. The application programs 226 and data 228 are illustrative of the programs and related data that implement various features of the consumer equipment 200, including communicating information packets via the controller 210 through the network interface 230 to a packet switched network. The trust verification/authentication application 230 supports operations for cooperating with a trust determination system to determine a level of trust of the consumer equipment 300, including hashing one or more portions of the information 222 and/or authenticating the consumer equipment 200 and/or a user of the consumer equipment 200, such as by function/acts described herein.

The controller 210 is configured communicate information packets through a packet switched network at a QoS that is defined by the packet switched network, and to generate trust indications, through the trust verification/authentication application 230, and to communicate the trust indications to the packet switched network for use in determining a level of trust for the consumer equipment 200 and controlling the QoS for communications therewith. The controller 210 may hash one or more portions of the information 222 to generate the trust indication(s), as described above, to determine whether, and what portion of, the information 222 has changed. The controller may participate in one or more authentication processes (e.g., SAML, a WEB services security protocol, Kerberos, and/or a Radius) as described above.

Figure 3:
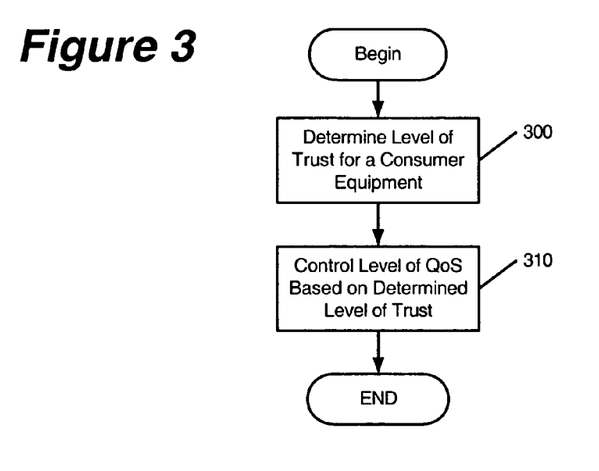
FIG. 3 is a flow chart illustrating operations for determining a level of trust for consumer equipment and for controlling quality of service based on the level of trust according to some embodiments of the present invention.

Referring now to FIG. 3, a flow chart is shown that illustrates operations for determining a level of trust and controlling QoS based thereon. At Block 300, a level of trust is determined for a consumer equipment. At Block 310, a QoS level is controlled for information packets that are associated with the consumer equipment and communicated through a packet switched network.

Figure 4:
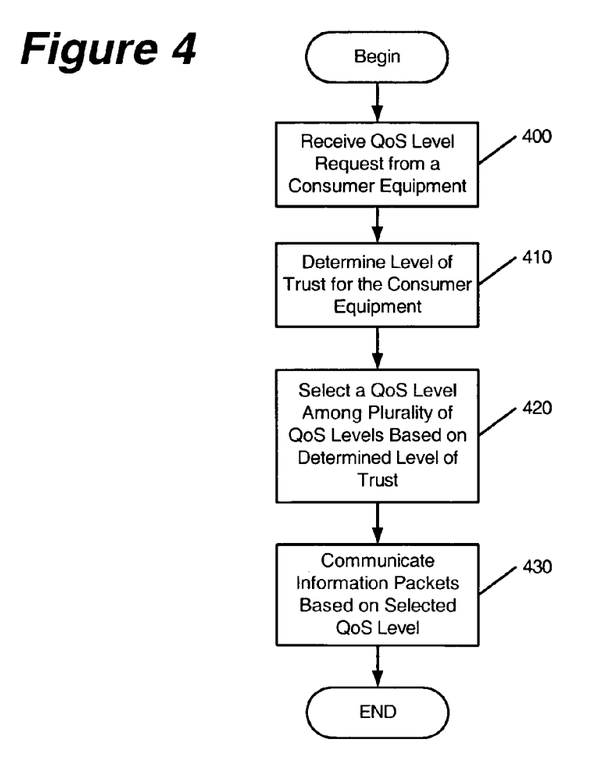
FIG. 4 is a flow chart illustrating further operations for determining a level of trust for consumer equipment and for controlling quality of service based on the level of trust according to some embodiments of the present invention.

Referring now to FIG. 4, a flow chart is shown of further operations that may be carried out to determine a level of trust and to control QoS based thereon. At Block 400, a request for a QoS level is received from a consumer equipment. At Block 410, a level of trust is determined for the consumer equipment. At Block 420, a QoS level is selected from among a plurality of QoS levels based on the determined level of trust. The selected QoS level may be modified based on, for example, a history database of earlier determined level of trust for the consumer equipment and/or other rules for allowable QoS level for the consumer equipment, such as was described above. At Block 430, information packets are communicated through a packet switched network based on the selected QoS level.

Figure 5:
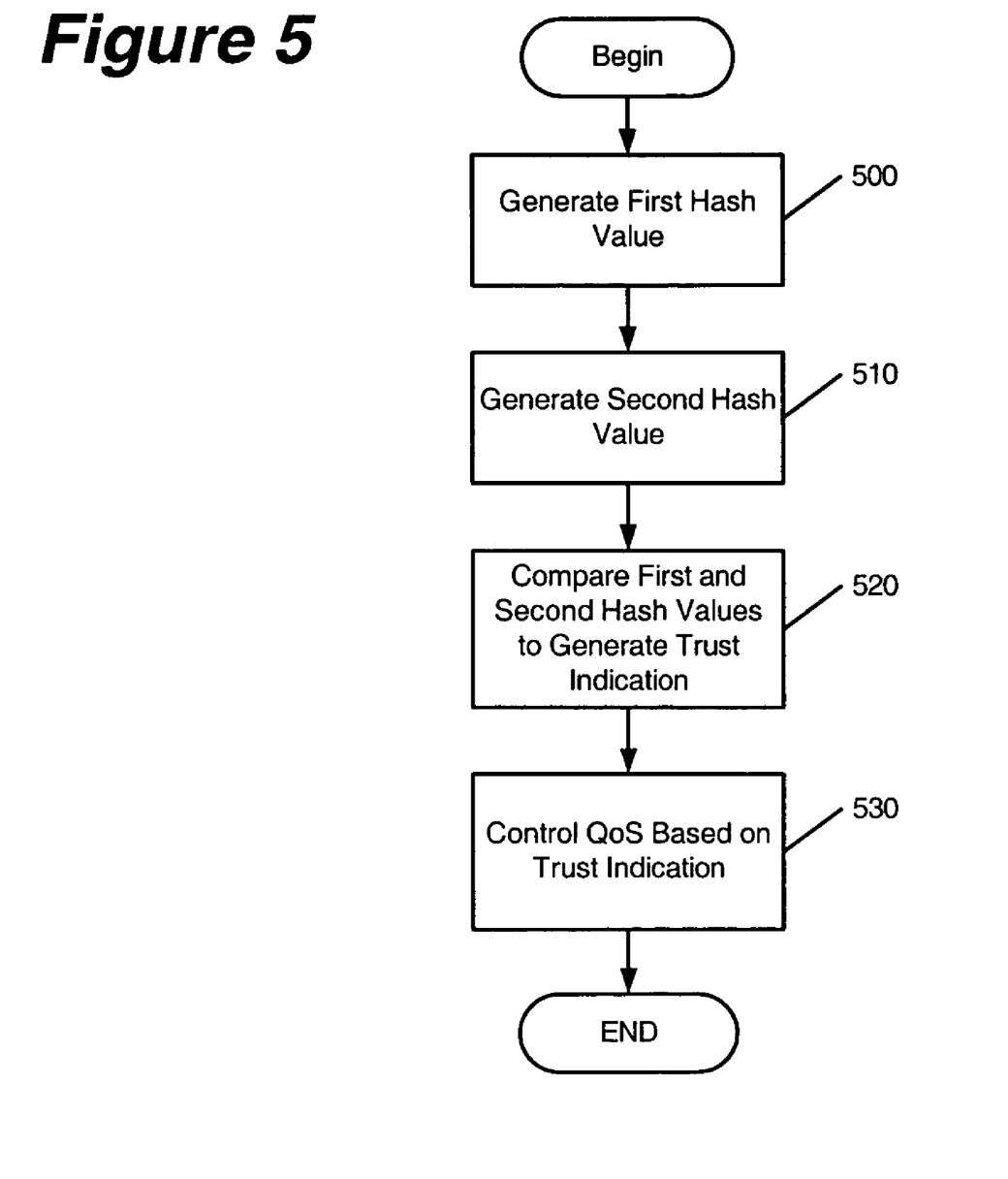
FIG. 5 is a flow chart illustrating operations for generating a trust indication based on hashing of information in the consumer equipment according to some embodiments of the present invention.

Referring now to FIG. 5, a flow chart is shown that illustrates operations for verifying a consumer equipment. At Block 500, information is hashed to generate a first hash value. At Block 510, information in a memory of the consumer equipment is hashed to generate a second hash value. At Block 520, the first hash value is compared to the second hash value to generate a trust indication. At Block 530, QoS is controlled for information packets communicated with the consumer equipment (i.e., communicated to and/or from the consumer equipment) based on the verification indication.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method of communicating information packets, the method comprising:
   determining a level of trust for a consumer equipment by hashing information that includes at least a portion of application program code in the consumer equipment, wherein a packet switched network determines the level of trust for the consumer equipment based on whether the hashing indicates that the information including the portion of application program code in the consumer equipment has changed; and
   controlling based on the determined level of trust at least one of capacity in the packet switched network that is allowed to be used to communicate the information packets associated with the consumer equipment, communication delay in the packet switched network that is allowed for the information packets associated with the consumer equipment, loss rate in the packet switched network that is allowed for the information packets associated with the consumer equipment, and priority in the packet switched network that is used for communicating the information packets associated with the consumer equipment, to control a level of Quality of Service (QoS) provided by the packet switched network for the information packets associated with the consumer equipment.

2. The method of claim 1, further comprising:
   selecting a QoS level from among at least two QoS levels based on the determining level of trust; and
   controlling communication of information packets associated with the consumer equipment by the packet switched network based on the selected QoS level.

3. The method of claim 1, further comprising:
   comparing the determined level of trust to at least one threshold value; and
   selectively granting based on the comparison one of a high QoS level, a low QoS level, or one of a plurality of pre-defined intermediate QoS levels for handling of information packets associated with the consumer equipment by the packet switched network.

4. The method of claim 1, further comprising:
   receiving a QoS level request from the consumer equipment; and
   within a packet switched network, granting a QoS level based on the determined level of trust.

5. The method of claim 4, wherein granting a QoS level based on the determined level of trust comprises:
   maintaining, within the packet switched network, a history of at least some earlier determined levels of trust for the consumer equipment; and
   controlling the level of QoS based on the determined level of trust and based on the history of the at least some earlier determined levels of trust.

6. The method of claim 1, wherein determining a level of trust for consumer equipment comprises:
   first hashing the information to generate a first hash value;
   second hashing the information in a memory of the consumer equipment to generate a second hash value in response to a trust determination request from the packet switched network; and
   determining by the packet switched network the level of trust for the consumer equipment based on a comparison of the first hash value and the second hash value.

7. The method of claim 1, wherein determining a level of trust for the consumer equipment comprises:
   generating a trust profile for the consumer equipment based on at least one of an account subscription level that is associated with the consumer equipment, credit information associated with a subscriber who is associated with the consumer equipment, law enforcement records associated with the subscriber, presence of children in a household of the subscriber, ages of children in the household of the subscriber, and earlier trust levels determined for the consumer equipment; and
   determining the level of trust for the consumer equipment based on the trust profile.

8. The method of claim 1, wherein determining a level of trust for the consumer equipment comprises authenticating the consumer equipment to determine the level of trust for the consumer equipment.

9. The method of claim 8, wherein determining a level of trust for the consumer equipment comprises:
   receiving a plurality of trust indications for the consumer equipment; and
   combining the plurality of trust indications to determine the level of trust for the consumer equipment.

10. The method of claim 8, further comprising:
    receiving a QoS level request from each of a plurality of consumer equipment;
    determining, within the packet switched network, a level of trust for each of the plurality of consumer equipment;

ranking the QoS level requests based on the determined level of trust for each of the plurality of consumer equipment; and controlling, within the packet switched network, QoS provided for information packets associated with the plurality of consumer equipment by the packet switched network based on the ranked QoS level requests.

11. A packet switched network comprising:

a trust determination system that is configured to determine a level of trust for consumer equipment by generating a trust determination request that is communicated to the consumer equipment to request that information that includes at least a portion of application program code residing in the consumer equipment be hashed to generate a first hash value, by receiving the first hash value from the consumer equipment, and by determining whether the first hash value corresponds to a second hash value residing at the trust determination system to determine the level of trust for the consumer equipment based on whether the first hash value matches the second hash value, and is configured to control based on the determined level of trust at least one of capacity in the packet switched network that is allowed to be used to communicate the information packets associated with the consumer equipment, communication delay in the packet switched network that is allowed for the information packets associated with the consumer equipment, loss rate in the packet switched network that is allowed for the information packets associated with the consumer equipment, and priority in the packet switched network that is used for communicating the information packets associated with the consumer equipment, to control a level of Quality of Service (QoS) for the information packets associated with the consumer equipment.

12. The packet switched network of claim 11, wherein the trust determination system is configured to select a QoS level from among at least two QoS levels based on the determined level of trust, and further comprising a network QoS application interface (API) that is configured to communicate information packets associated with the consumer equipment through the packet switched network based on the selected QoS level, wherein the QoS levels correspond to different capacity levels in a packet switched network that are allowed to be used to communicate information packets associated with the consumer equipment, different communication delay levels in the packet switched network that are allowed for information packets associated with the consumer equipment, different loss rate levels in the packet switched network that are allowed for information packets associated with the consumer equipment, and/or different priority levels in the packet switched network that are used for communicating information packets associated with the consumer equipment.

13. The packet switched network of claim 11, wherein the trust determination system is configured to generate a trust profile for the consumer equipment based on at least one of an account subscription level that is associated with the consumer equipment, credit information associated with a subscriber who is associated with the consumer equipment, law enforcement records associated with the subscriber, presence of children in a household of the subscriber, ages of children in the household of the subscriber, and earlier trust levels determined for the consumer equipment, and is configured to determine the level of trust for the consumer equipment based on the trust profile.

14. The packet switched network of claim 11, wherein the trust determination system is configured to authenticate the consumer equipment to determine the level of trust for the consumer equipment.

15. The packet switched network of claim 11, wherein the trust determination system is configured to receive a plurality of trust indications for the consumer equipment, and is configured to combine the plurality of trust indications to determine the level of trust for the consumer equipment.

16. The packet switched network of claim 11, wherein the trust determination system is configured to receive a QoS level request from each of a plurality of consumer equipment, configured to determine a level of trust for each of the plurality of consumer equipment, configured to rank the QoS level requests based on the determined level of trust for each of the plurality of consumer equipment, and configured to control QoS for information packets associated with the plurality of consumer equipment that are communicated through the packet switched network based on the ranked QoS level requests.

17. The method of claim 1, further comprising constraining the capacity in the packet switched network that is allowed to be used to communicate information packets associated with the consumer equipment based on the determined level of trust.

18. The method of claim 1, further comprising controlling the communication delay in the packet switched network that is allowed for information packets associated with the consumer equipment based on the determined level of trust.

19. The method of claim 1, further comprising controlling the loss rate in the packet switched network that is allowed for information packets associated with the consumer equipment based on the determined level of trust.

20. The packet switched network of claim 11, wherein the trust determination system is configured to constrain the capacity in a packet switched network that is allowed to be used to communicate information packets associated with the consumer equipment based on the determined level of trust.

21. The packet switched network of claim 11, wherein the trust determination system is configured to control the communication delay in the packet switched network that is allowed for information packets associated with the consumer equipment based on the determined level of trust.

22. The packet switched network of claim 11, wherein the trust determination system is configured to control the loss rate in the packet switched network that is allowed for information packets associated with the consumer equipment based on the determined level of trust.

23. The method of claim 1, wherein determining a level of trust for the consumer equipment comprises:

receiving at the packet switched network first hash information generated by the consumer equipment; and comparing at the packet switched network the received first hash information to second hash information residing at the packet switched network to determine the level of trust for the consumer equipment based on whether the first hash information matches the second hash information.

24. The method of claim 23, further comprising:

generating at the packet switched network a trust determination request that is communicated to the consumer equipment to cause the consumer equipment to hash information that includes at least a portion of application program code that resides at the consumer equipment to generate the first hash information and communicate the first hash information to the packet switched network.

25. The method of claim 24, wherein the trust determination request identifies particular program code residing at the consumer equipment that is to be hashed by the consumer equipment to generate the first hash information.

26. The method of claim 1, wherein the packet switched network responds to the determined level of trust by varying a maximum transmission unit size that is allowed for information packets communicated through the packet switched network from the consumer equipment.

27. The packet switched network of claim 11, wherein the trust determination system is further configured to generate the trust determination request with data that identifies particular program code residing at the consumer equipment that is to be hashed by the consumer equipment to generate the first hash value.

* * * * *